United States Patent
Park et al.

(10) Patent No.: US 10,983,395 B2
(45) Date of Patent: Apr. 20, 2021

(54) DISPLAY APPARATUS COMPRISING A COLOR CONVERSION PATTERN AND A BLUE LIGHT BLOCKING PATTERN DISPOSED ON A DATA PATTERN OF A THIN FILM TRANSISTOR AND METHOD OF MANUFACTURING THE SAME

(71) Applicant: Samsung Display Co., Ltd., Yongin-si (KR)

(72) Inventors: Doyeong Park, Hwaseong-si (KR); Kee-Bum Park, Cheonan-si (KR); Seongyoung Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/738,540

(22) Filed: Jan. 9, 2020

(65) Prior Publication Data

US 2020/0150493 A1    May 14, 2020

Related U.S. Application Data

(62) Division of application No. 15/868,869, filed on Jan. 11, 2018, now Pat. No. 10,558,082.

(30) Foreign Application Priority Data

Jul. 5, 2017 (KR) .......................... 10-2017-0085480

(51) Int. Cl.
*G02F 1/13357* (2006.01)
*G02F 1/1335* (2006.01)
(Continued)

(52) U.S. Cl.
CPC .. *G02F 1/133617* (2013.01); *G02F 1/133512* (2013.01); *G02F 1/133514* (2013.01);
(Continued)

(58) Field of Classification Search
CPC ... G02F 1/133617; G02F 2001/136218; G02F 2001/133614; G02F 2001/133548; G02F 2001/01791; G02F 2001/133357
See application file for complete search history.

(56) References Cited

U.S. PATENT DOCUMENTS 6,005,619 A * 12/1999 Fossum ............ H01L 27/14603
257/E27.131
8,564,754 B2   10/2013 Kim et al.
(Continued)

FOREIGN PATENT DOCUMENTS

KR   10-2012-0004045    1/2012
KR   10-2014-0111870    9/2014
(Continued)

OTHER PUBLICATIONS

Non-Final Office Action dated Nov. 30, 2018, in U.S. Appl. No. 15/868,869.
(Continued)

*Primary Examiner* — Paul C Lee
(74) *Attorney, Agent, or Firm* — H.C. Park & Associates, PLC

(57) ABSTRACT

A display apparatus includes a backlight unit to emit blue light, a first base substrate disposed on the backlight unit, a gate pattern disposed on the first base substrate, a first inorganic insulation layer disposed on the gate pattern, a data pattern disposed on the first inorganic insulation layer, a blue light blocking pattern disposed on the first inorganic insulation layer on which the data pattern is disposed, a second inorganic insulation layer disposed on the data pattern and the first inorganic insulation layer, a shielding electrode disposed on the blue light blocking pattern and overlapping the gate pattern and/or the data pattern, a pixel electrode disposed on the second inorganic insulation layer, and electrically connected to the drain electrode, a color
(Continued)

conversion pattern overlapping the pixel electrode, and includes a quantum dot and/or phosphor, and a liquid crystal layer disposed between the pixel electrode and the color conversion pattern.

4 Claims, 17 Drawing Sheets

(51) Int. Cl.
    *G02F 1/1362*     (2006.01)
    *G02F 1/017*     (2006.01)
    *G02F 1/1333*     (2006.01)

(52) U.S. Cl.
    CPC ............... *G02F 1/136209* (2013.01); *G02F 2001/01791* (2013.01); *G02F 2001/133357* (2013.01); *G02F 2001/133548* (2013.01); *G02F 2001/133614* (2013.01); *G02F 2001/136218* (2013.01); *G02F 2001/136222* (2013.01)

(56) References Cited

U.S. PATENT DOCUMENTS

| | | | | |
|---|---|---|---|---|
| 2003/0128309 A1* | 7/2003 | Yamada | ............... | G02F 1/13394 349/106 |
| 2010/0201909 A1* | 8/2010 | Jung | ............... | G02F 1/133528 349/61 |
| 2010/0309416 A1* | 12/2010 | Gotoh | ............... | G02F 1/133514 349/123 |
| 2011/0227111 A1 | 9/2011 | Choi et al. | | |
| 2014/0267962 A1 | 9/2014 | Jung et al. | | |
| 2015/0015838 A1* | 1/2015 | Chang | ............... | G02F 1/13394 349/110 |
| 2016/0062178 A1* | 3/2016 | Kim | ............... | G02B 1/005 349/106 |
| 2016/0117812 A1* | 4/2016 | Pandev | ............... | G06T 7/0004 382/149 |
| 2016/0306226 A1 | 10/2016 | Yoon et al. | | |

FOREIGN PATENT DOCUMENTS

| | | |
|---|---|---|
| KR | 10-2016-0028580 | 3/2016 |
| KR | 10-2016-0124977 | 10/2016 |

OTHER PUBLICATIONS

Non-Final Office Action dated Jun. 13, 2019, in U.S. Appl. No. 15/868,869.

Notice of Allowance dated Oct. 1, 2019, in U.S. Appl. No. 15/868,869.

* cited by examiner

FIG. 3C
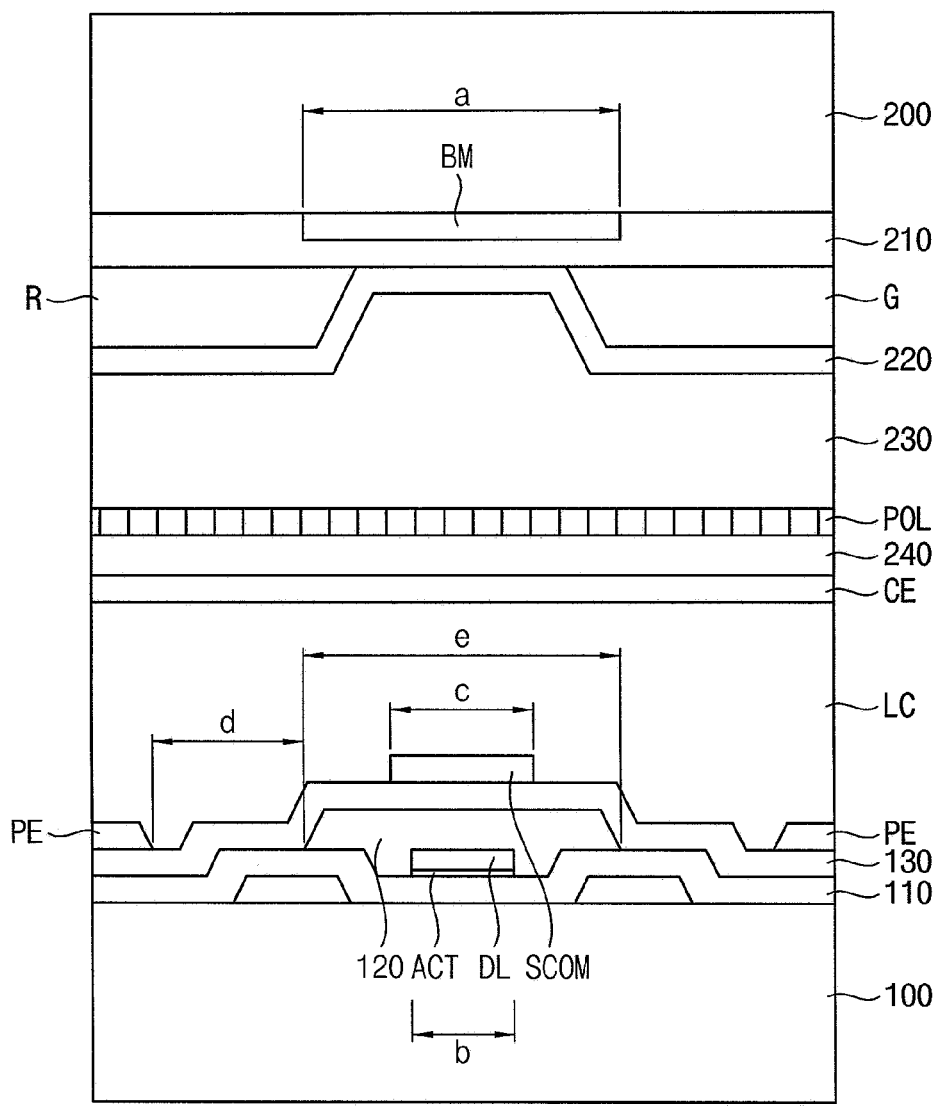
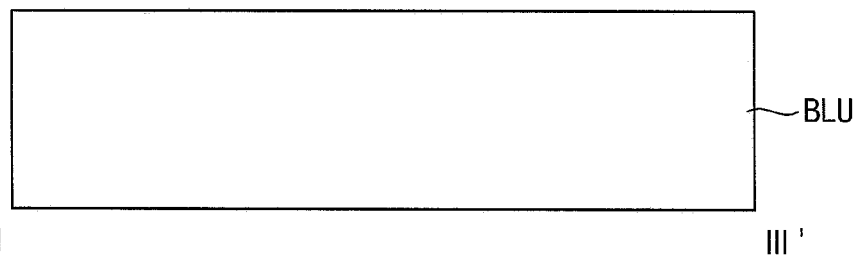

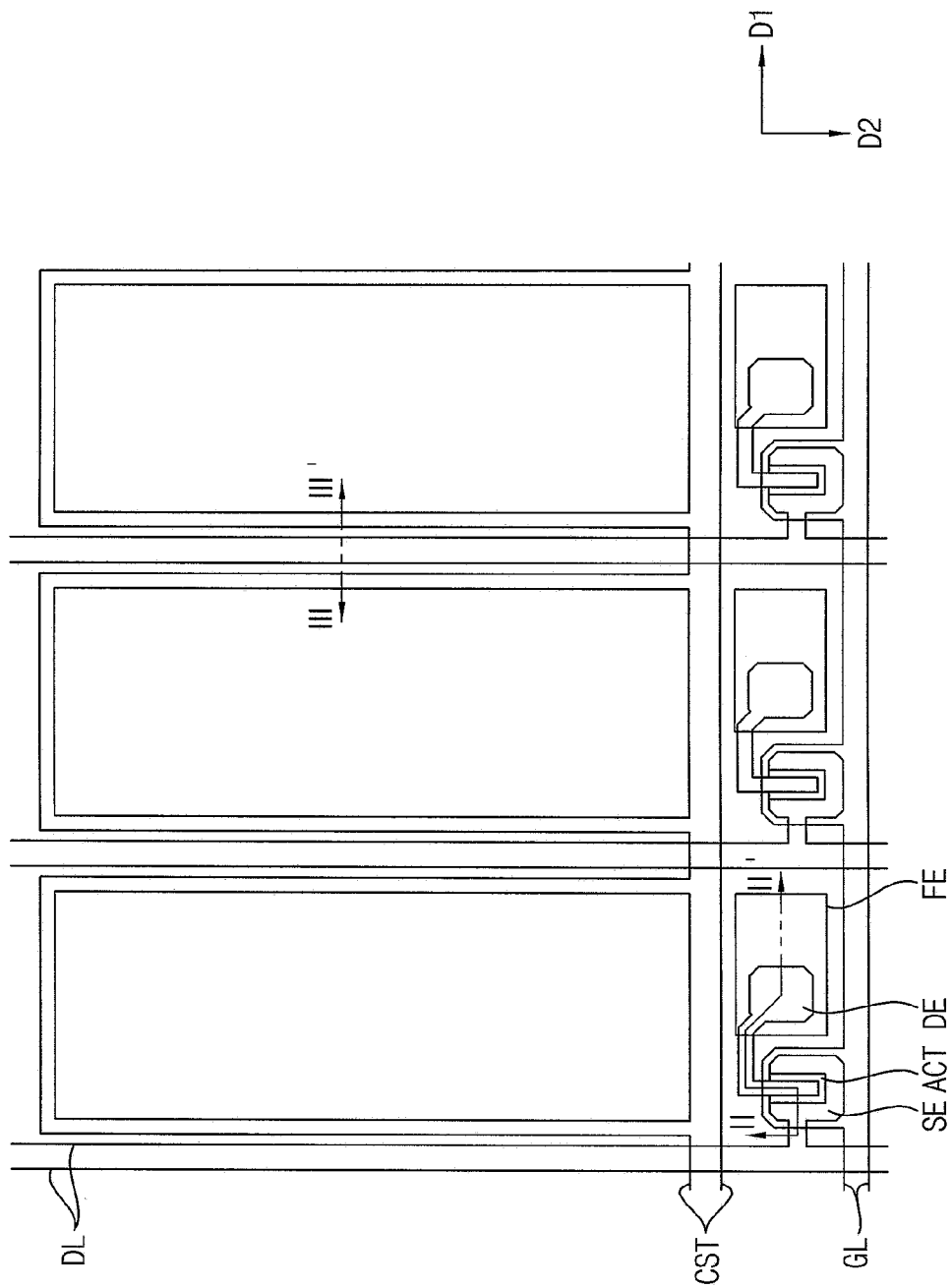

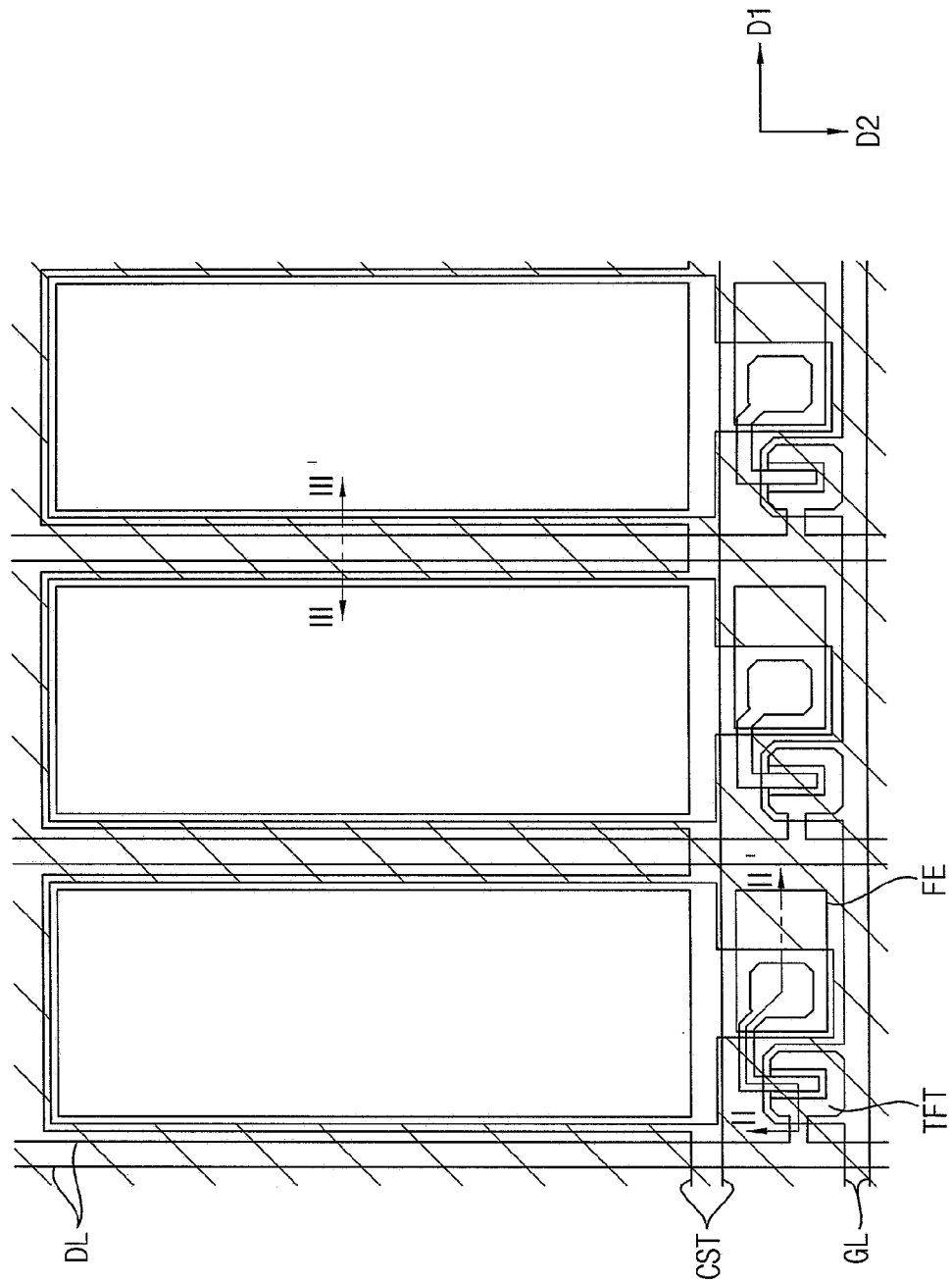

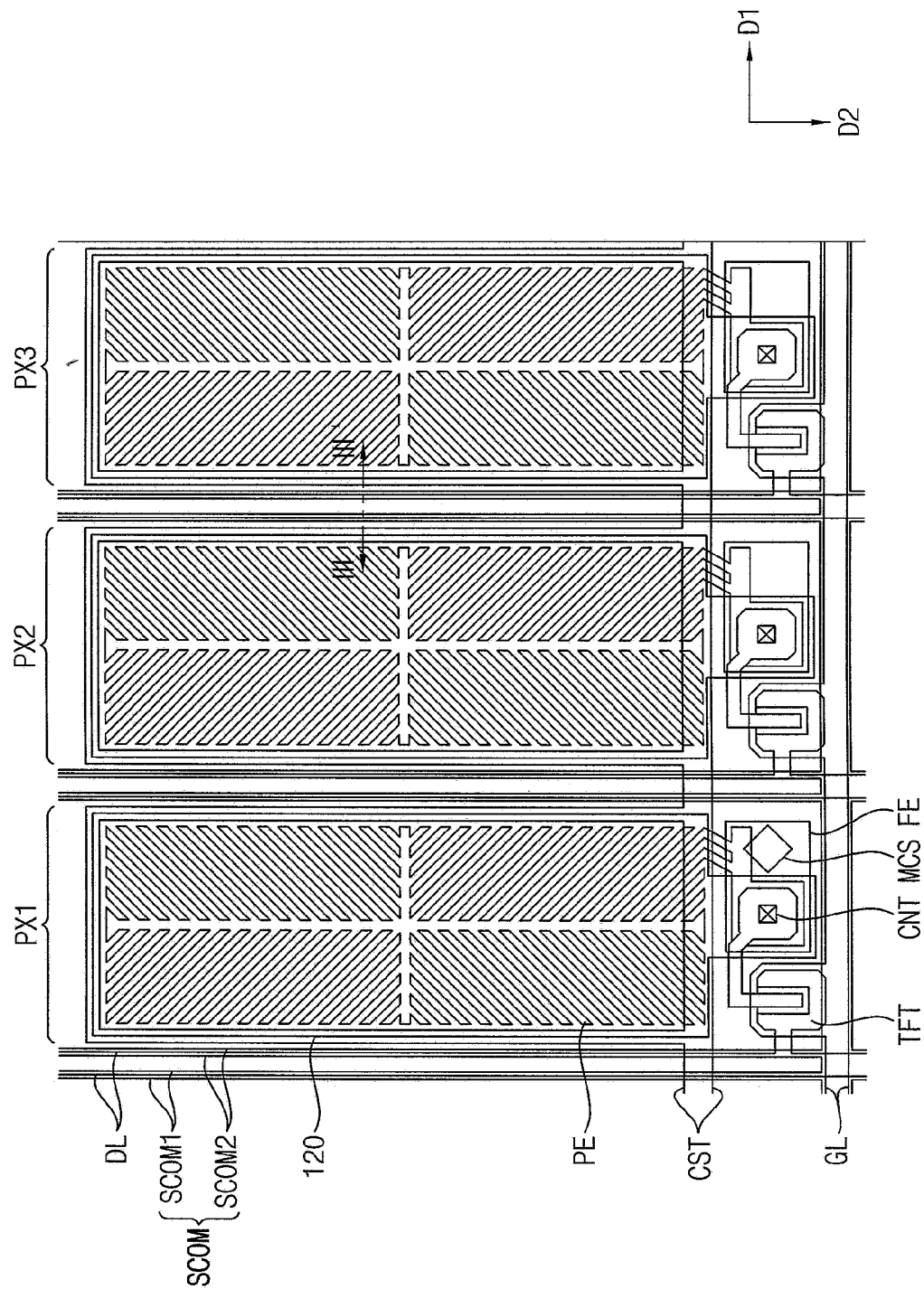

FIG. 9
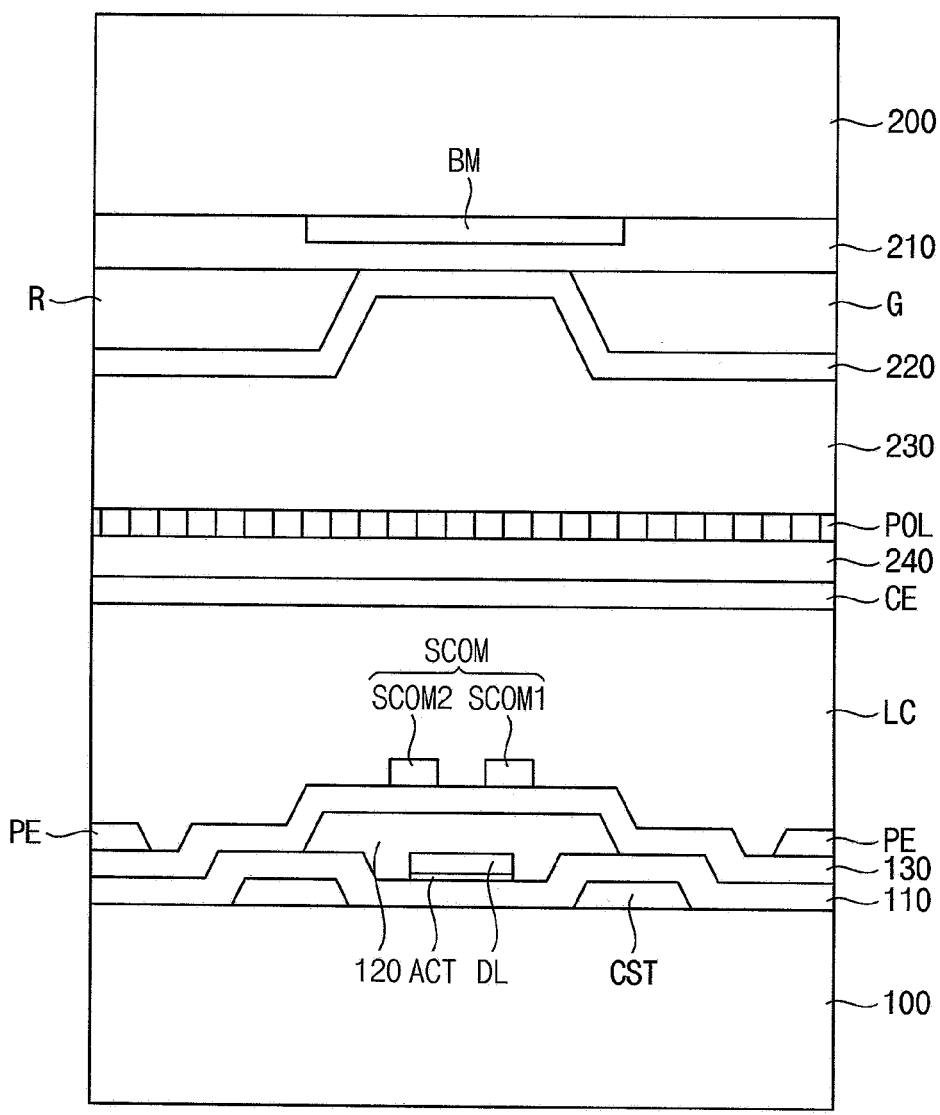
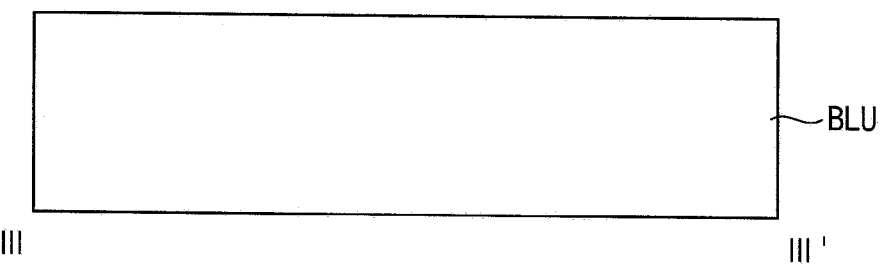

DISPLAY APPARATUS COMPRISING A COLOR CONVERSION PATTERN AND A BLUE LIGHT BLOCKING PATTERN DISPOSED ON A DATA PATTERN OF A THIN FILM TRANSISTOR AND METHOD OF MANUFACTURING THE SAME

CROSS-REFERENCE TO RELATED APPLICATION

This application is a Division of U.S. patent application Ser. No. 15/868,869, filed Jan. 11, 2018, which claims priority to and the benefit of Korean Patent Application No. 10-2017-0085480, filed on Jul. 5, 2017, each of which is incorporated by reference for all purposes as if fully set forth herein.

BACKGROUND

Field

Exemplary embodiments relate to a display apparatus and a method of manufacturing the display apparatus. More particularly, exemplary embodiments relate to a display apparatus using photoluminescence and a method of manufacturing the display apparatus.

Discussion of the Background

Recently, a display apparatus having light weight and small size has been manufactured. Previously, a cathode ray tube (CRT) display apparatus has been used due to its performance and competitive price. However the CRT display apparatus has a weakness with size and/or portability. Therefore a display apparatus such as a plasma display apparatus, a liquid crystal display apparatus, and an organic light emitting display apparatus has been highly regarded due to their small size, light weight, and low-power-consumption.

The display apparatus may further include a photoluminescence device. The photoluminescence device includes a color conversion structure for converting the color of light, such as a quantum dot. A desired color can be imparted to the image by the photoluminescence device. Thus, color reproducibility of the image and the luminous efficiency can be improved, so that the display quality can be improved. The display apparatus including the photoluminescence device can use a backlight unit which generates blue light. However, it has been found that there is a problem with lowered transmittance due to the insulating film structure inside the display apparatus.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus capable of improving transmittance.

Exemplary embodiments also provide a method of manufacturing the display apparatus.

Additional aspects will be set forth in the detailed description which follows, and, in part, will be apparent from the disclosure, or may be learned by practice of the inventive concept.

According to exemplary embodiments, a display apparatus includes a backlight unit to emit blue light, a first base substrate disposed on the backlight unit, a gate pattern disposed on the first base substrate, a first inorganic insulation layer disposed on the gate pattern, a data pattern disposed on the first inorganic insulation layer, a blue light blocking pattern disposed on the first inorganic insulation layer on which the data pattern is disposed, a second inorganic insulation layer disposed on the data pattern and the first inorganic insulation layer, a shielding electrode disposed on the blue light blocking pattern and overlapping the gate pattern and/or the data pattern, a pixel electrode disposed on the second inorganic insulation layer, and electrically connected to the drain electrode, a color conversion pattern overlapping the pixel electrode, and comprising a quantum dot and/or phosphor, and a liquid crystal layer disposed between the pixel electrode and the color conversion pattern.

In an exemplary embodiment, the data pattern may include a source electrode, a drain electrode and a data line. The shielding electrode may overlap the data line. The blue light blocking pattern may be disposed between the data line and the shielding electrode.

In an exemplary embodiment, the shielding electrode may include a first shielding electrode and a second shielding electrode which is spaced apart from the first shielding electrode and extends in parallel with the first shielding electrode.

In an exemplary embodiment, the pixel electrode and the shielding electrode may include transparent conductive material.

In an exemplary embodiment, the blue light blocking pattern may be disposed between the first inorganic insulation layer and the second inorganic insulation layer.

In an exemplary embodiment, the first inorganic insulation layer and the second inorganic insulation layer may be disposed between the pixel electrode and the first base substrate. The pixel electrode may be located within 2 um (micrometer) from the first base substrate.

In an exemplary embodiment, an organic insulating layer may be not present between the pixel electrode and the first base substrate.

In an exemplary embodiment, the display apparatus may further include a second base substrate opposite to the first base substrate, a blue light blocking layer disposed on the second base substrate, and a transparent pattern disposed on the second base substrate. The color conversion pattern may be disposed on the blue light blocking layer, and include a first color conversion pattern which includes a red quantum dot and/or red phosphor, and a second color conversion pattern which includes a green quantum dot and/or green phosphor.

In an exemplary embodiment, the display apparatus may further include a polarizer disposed between the color conversion pattern and the liquid crystal layer and between the transparent pattern and the liquid crystal layer.

In an exemplary embodiment, the display apparatus may further include a light blocking pattern disposed on the second base substrate and overlapping the shielding electrode.

In an exemplary embodiment, the display apparatus may further include a main column spacer disposed on the second inorganic insulation layer and overlapping the gate pattern.

In an exemplary embodiment, the gate pattern, the first inorganic insulation layer, the blue light blocking pattern and the second inorganic insulation layer may be disposed between the main column spacer and the first base substrate.

In an exemplary embodiment, the display apparatus may further include a thin film transistor disposed on the first base substrate. The blue light blocking pattern may overlap the thin film transistor. The blue light blocking pattern may be disposed between the thin film transistor and the liquid crystal layer.

In an exemplary embodiment, the blue light blocking pattern may be a red color filter.

In an exemplary embodiment, the blue light blocking pattern may have about 1 to 2 μm (micrometer).

According to exemplary embodiments, a method of manufacturing a display apparatus includes providing a backlight unit emitting blue light, forming a gate pattern on a first base substrate, forming a first inorganic insulation layer on the gate pattern, forming a data pattern on the first inorganic insulation layer, forming a blue light blocking pattern on the data pattern, forming a second insulation layer on the blue light blocking pattern, forming a shielding electrode and a pixel electrode on the second inorganic insulation layer, forming a color conversion pattern comprising a quantum dot and/or phosphor on a second base substrate, forming a planarization layer on the color conversion pattern, forming a wire grid polarizer on the planarization layer, and forming a liquid crystal layer between the first base substrate on which the pixel electrode is formed and the second base substrate on which the wire grid polarizer is formed.

In an exemplary embodiment, the data pattern may include a source electrode, a drain electrode and a data line. The shielding electrode may overlap the data line. The blue light blocking pattern may be disposed between the data line and the shielding electrode.

In an exemplary embodiment, the method may further include forming a main column spacer on the second insulation layer. The gate pattern, the first inorganic insulation layer, the blue light blocking pattern and the second inorganic insulation layer may be disposed between the first main column spacer and the first base substrate.

In an exemplary embodiment, the gate pattern may include a gate electrode and a gate pattern. The gate electrode, the source electrode and the drain electrode may be included in a thin film transistor. The blue light blocking pattern may be disposed between the thin film transistor and the liquid crystal layer.

In an exemplary embodiment, the blue light blocking pattern may be a red color filter.

According to exemplary embodiments, since the organic insulating layer is omitted in the lower substrate on which the thin film transistor is formed, and the display apparatus includes only the inorganic insulating layer, loss of transmittance of the blue light emitted from the backlight unit may be minimized.

In addition, the display apparatus may include a shielding electrode overlapping the data line and the gate line. A blue light blocking pattern may be formed between the data line and the shielding electrode, and between the gate line and the shielding electrode. Accordingly, it is possible to prevent deterioration of display quality due to parasitic capacitance between the data and gate lines and the shielding electrode, and it is possible to prevent light leakage caused by inability to control the liquid crystal around the gate line and the data line.

In addition, since the blue light blocking pattern is located on the thin film transistor, the characteristics of the thin film transistor may be improved, and the sub-column spacer may be formed. Thus, when forming the main column spacer, it is possible to secure a pressing gap without forming a separate sub-column spacer using a halftone mask or the like.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 3C is a cross-sectional view taken along a line of FIG. 2.

FIGS. 4A, 4B, 4C, 5A, 5B, 5C, 6A, 6B, 6C, 7A, 7B and 7C are plan views and cross sectional views illustrating a method of manufacturing the display apparatus of FIG. 2.

FIG. 8 is a plan view illustrating first to third pixel areas of a display apparatus according to an exemplary embodiment of the inventive concepts.

FIG. 9 is a cross-sectional view taken along a line III-III' of FIG. 8.

DETAILED DESCRIPTION OF THE ILLUSTRATED EMBODIMENTS

Figure 1:
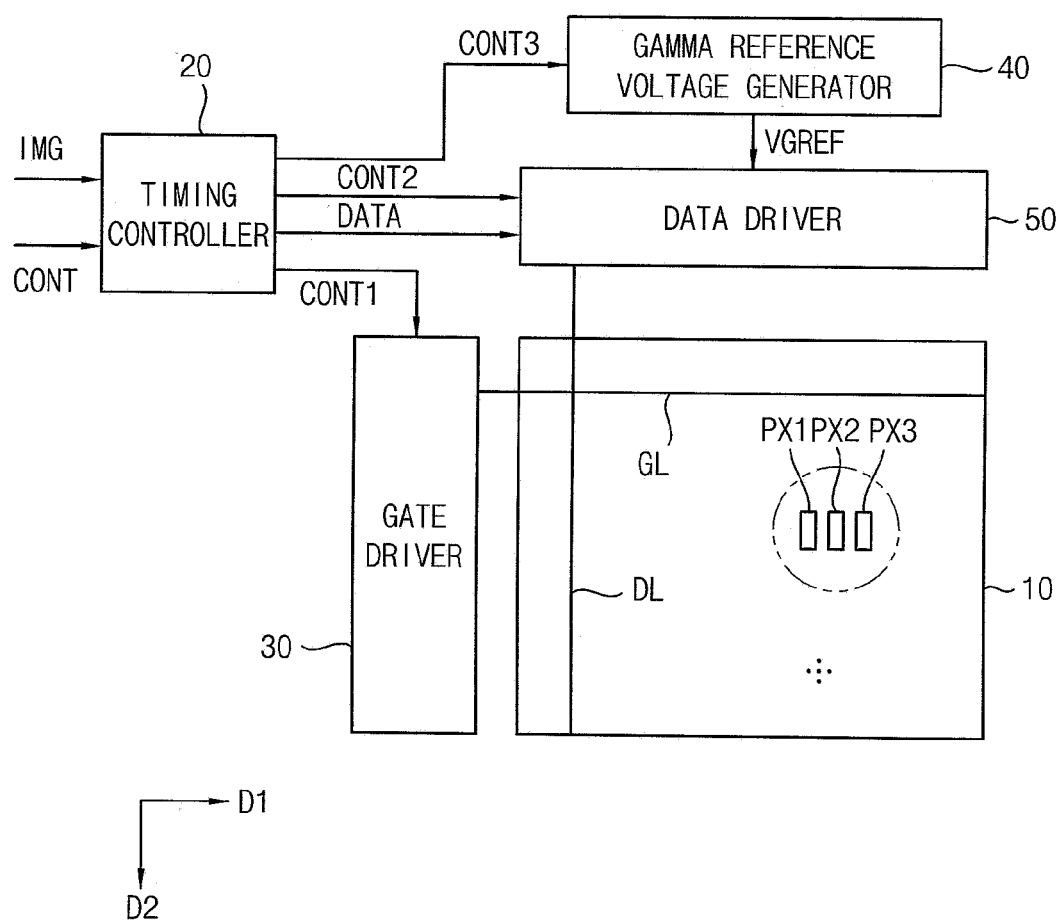
FIG. 1 is a block diagram illustrating a display apparatus according to an exemplary embodiment of the inventive concepts.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the inventive concept will be explained in detail with reference to the accompanying drawings.

FIG. 1 is a block diagram illustrating a display apparatus according to an exemplary embodiment.

Referring to FIG. 1, the display apparatus may include a display panel 10 and a display panel driver. The display panel driver may include a timing controller 20, a gate driver 30, a gamma reference voltage generator 40, and a data driver 50. The display apparatus may further include a backlight unit (see BLU of FIG. 3A).

The display panel 10 may include a plurality of gate lines GL, a plurality of data lines DL, and a plurality of pixels electrically connected to the gate lines GL and the data lines DL. The gate lines GL may extend in a first direction D1 and the data lines DL may extend in a second direction D2 crossing the first direction D1.

The display panel 10 may include a first substrate, a second substrate facing the first substrate, and a liquid crystal layer disposed between the first substrate and the second substrate. The gate lines, the data lines, pixel electrodes of the pixels, and the switching elements may be formed on the first substrate. A common electrode may be formed on the second substrate. A detailed description thereof will be described later with reference to FIGS. 2, 3A, 3B, and 3C.

The timing controller 20 may receive input image data IMG and an input control signal CONT from an external apparatus (not shown). The input image data may include red image data, green image data, and blue image data. The input control signal CONT may include a master clock signal and a data enable signal. The input control signal CONT may further include a vertical synchronizing signal and a horizontal synchronizing signal.

The timing controller 20 may generate a first control signal CONT1, a second control signal CONT2, a third control signal CONT3, and a data signal DATA based on the input image data IMG and the input control signal CONT.

The timing controller 20 may generate the first control signal CONT1 for controlling an operation of the gate driver 30 based on the input control signal CONT, and outputs the first control signal CONT1 to the gate driver 30. The first control signal CONT1 may further include a vertical start signal and a gate clock signal.

The timing controller 20 may generate the second control signal CONT2 for controlling an operation of the data driver 50 based on the input control signal CONT, and outputs the second control signal CONT2 to the data driver 50. The second control signal CONT2 may include a horizontal start signal and a load signal.

The timing controller 20 may generate the data signal DATA based on the input image data IMG. The timing controller 20 may output the data signal DATA to the data driver 50.

The timing controller 20 may generate the third control signal CONT3 for controlling an operation of the gamma reference voltage generator 40 based on the input control signal CONT, and output the third control signal CONT3 to the gamma reference voltage generator 40.

The gate driver 30 may generate gate signals driving the gate lines GL in response to the first control signal CONT1 received from the timing controller 20. The gate driver 30 may sequentially output the gate signals to the gate lines GL.

The gamma reference voltage generator 40 may generate a gamma reference voltage VGREF in response to the third control signal CONT3 received from the timing controller 20. The gamma reference voltage generator 40 may provide the gamma reference voltage VGREF to the data driver 50.

The gamma reference voltage VGREF may have a value corresponding to a level of the data signal DATA.

In an exemplary embodiment, the gamma reference voltage generator 40 may be disposed in the timing controller 20 or in the data driver 50.

The data driver 50 may receive the second control signal CONT2 and the data signal DATA from the timing controller 20, and receive the gamma reference voltages VGREF from the gamma reference voltage generator 40. The data driver 50 may convert the data signal DATA into data voltages having an analog type using the gamma reference voltages VGREF. The data driver 50 may output the data voltages to the data lines DL.

The display apparatus may include a plurality of pixel areas arranged in a matrix form. The pixel areas may include a first pixel area PX1, a second pixel area PX2, and a third pixel area PX3 which are disposed adjacent to each other.

Figure 2:
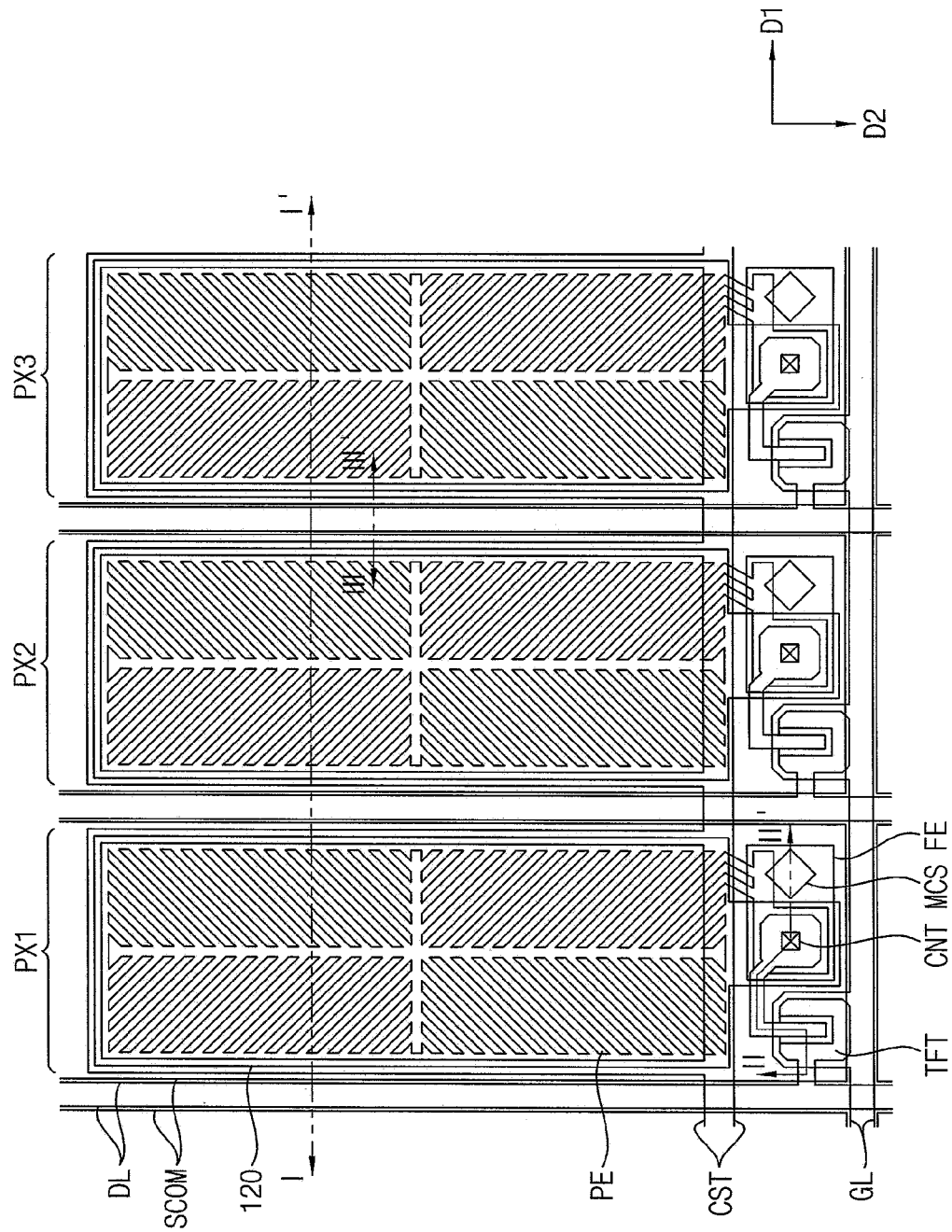
FIG. 2 is a plan view illustrating first to third pixel areas of the display apparatus of FIG. 1.
Figure 3A:
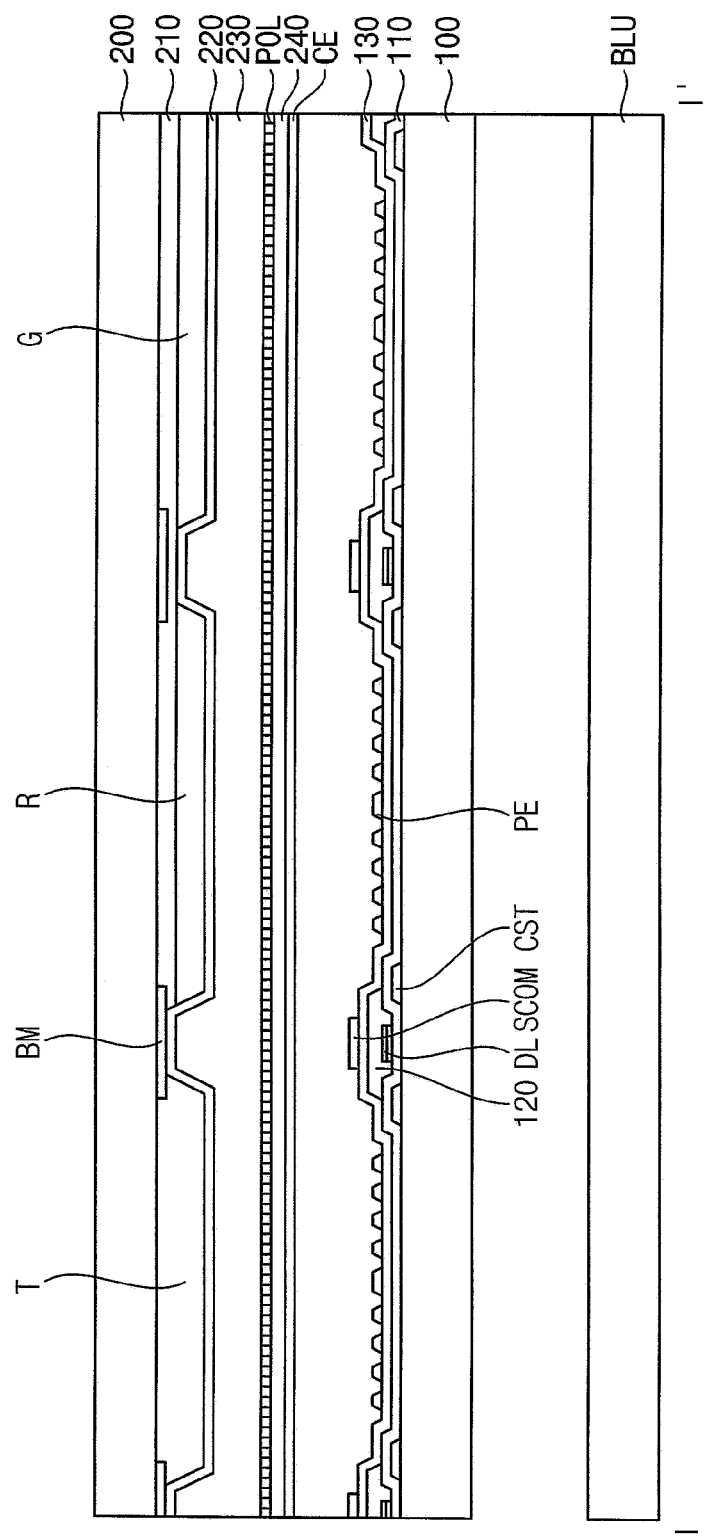
FIG. 3A is a cross-sectional view taken along a line I-I' of FIG. 2.
Figure 3B:
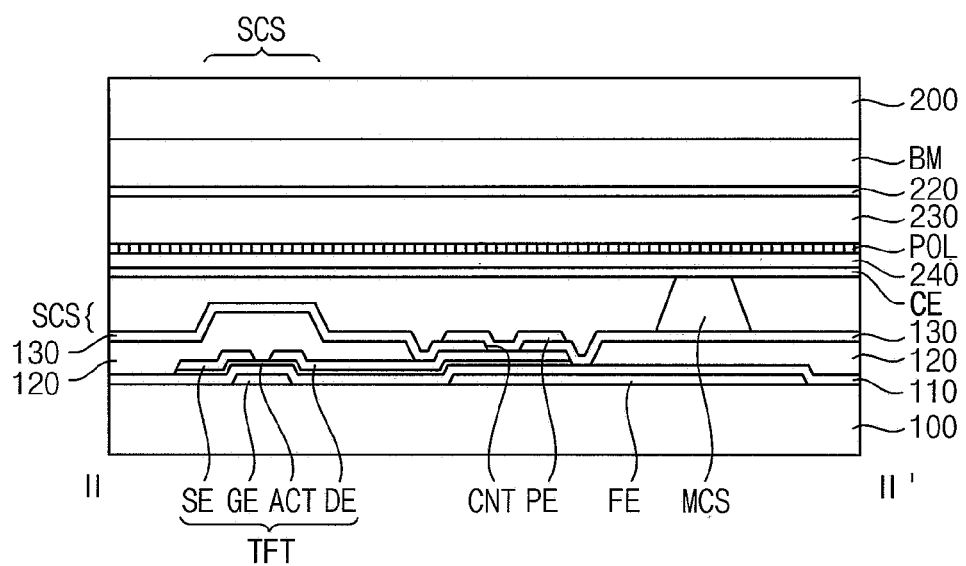
FIG. 3B is a cross-sectional view taken along a line II-II' of FIG. 2.

FIG. 2 is a plan view illustrating first to third pixel areas of the display apparatus of FIG. 1. FIG. 3A is a cross-sectional view taken along a line I-I' of FIG. 2. FIG. 3B is a cross-sectional view taken along a line II-II' of FIG. 2. FIG. 3C is a cross-sectional view taken along a line III-III' of FIG. 2.

Referring to FIGS. 2, 3A, and 3C, the display apparatus may include a backlight unit BLU, a first base substrate 100, a gate pattern, a first inorganic insulation layer 110, an active pattern ACT, a data pattern, a blue light blocking pattern 120, a second inorganic insulation layer 130, a transparent electrode layer, a main column spacer MCS, a liquid crystal layer LC, a common electrode CE, a capping layer 240, a polarizer POL, a planarization layer 230, a light recycling filter layer 220, a transparent pattern T, a first color conversion pattern R, a second color conversion pattern G, a blue light blocking layer 210, a light blocking layer BM, and a second base substrate 200.

The backlight unit BLU may be disposed under the first base substrate 100 to provide light to the liquid crystal layer LC. More specifically, the backlight unit BLU may include a light source for generating light having a first wavelength and a light guide plate (not shown) for receiving the light generated from the light source and guiding the light toward the liquid crystal layer LC. The first wavelength may be from about 400 nm to about 500 nm and the light may be blue. Thus, the backlight unit BLU may generate blue light and provide the blue light to the liquid crystal layer LC. For example, the backlight unit BLU may include a blue light emitting diode as the light source.

The first base substrate 100 may be disposed on the backlight unit BLU. The first base substrate 100 may include a transparent insulation substrate. For example, the first base substrate 100 may include a glass substrate, a quartz substrate, a transparent resin substrate, etc. Examples of the transparent resin substrate for the first base substrate 100 may include polyimide-based resin, acryl-based resin, polyacrylate-based resin, polycarbonate-based resin, polyether-based resin, sulfonic acid containing resin, polyethylene-terephthalate-based resin, etc.

The gate pattern may be disposed on the first base substrate 100. The gate pattern may include a gate line GL, a gate electrode GE, a floating electrode FE, and a CST line CST.

The gate line GL may extend in a first direction D1. The gate electrode GE may electrically connected to the gate line GL. The gate electrode GE may protrude from the gate line GL in a second direction D2 crossing the first direction D1. The second direction D2 may be substantially perpendicular to the first direction D1. The floating electrode FE may be spaced part from the gate line GL. The floating electrode FE may be spaced apart from the gate line GL. The floating electrode FE may be in a floating state in which no additional voltage is applied. The CST line CST may extend in the first direction D1 and the second direction D2, and may be formed so as to overlap with edge of the pixel electrode PE, described later. In order to prevent light leakage at the edge portion of the pixel electrode PE, a CST voltage may be applied to the CST line CST. The CST line CST may be connected to the CST line of the neighboring pixel in the first direction D1.

The inorganic insulation layer 110 may be disposed on the gate pattern and the first base substrate 100. The first inorganic insulation layer 110 may include an inorganic insulating material. The first inorganic insulating layer 110 may have a thickness of about 1 μm (micrometer) or less. For example, the first inorganic insulating layer 110 may have a thickness of about 0.1 um.

The active pattern ACT may be disposed on the first inorganic insulation layer 110. The active pattern ACT may overlap the gate electrode GE. The active pattern ACT may include a semiconductor layer consisting of amorphous silicon (a-Si:H) and an ohmic contact layer consisting of n+ amorphous silicon (n+ a-Si:H). In some exemplary embodiments, the active pattern ACT may include an oxide semiconductor. For example, the oxide semiconductor may be an amorphous oxide containing at least one of indium (In), zinc (Zn), gallium (Ga), tin (Sn), or hafnium (Hf).

The data pattern may be disposed on the active pattern ACT and the first inorganic insulating layer 110. The data pattern may include a data line DL, a source electrode SE, and a drain electrode DE. The data line DL may extend in a second direction D2, and be electrically connected to the source electrode SE. The drain electrode DE may be spaced apart from the source electrode SE, and a portion of the drain electrode DE may be overlapped with the floating electrode FE. A portion of the active pattern ACT located between the source electrode SE and the drain electrode DE may form a channel region. The gate electrode GE, the active pattern ACT, the source electrode SE, and the drain electrode DE may be included in a thin film transistor TFT.

In the present exemplary embodiment, the data pattern is formed to have substantially the same outer pattern of active pattern ACT using the same mask as the active pattern ACT, but the present disclosure is not limited thereto. For example, the active pattern ACT and the data pattern may be formed using different masks and have different pattern shapes.

The blue light blocking pattern 120 may be formed on the data line DL and the thin film transistor TFT to overlap the data line DL and the thin film transistor TFT. The blue light blocking pattern 120 may be any material that absorbs blue light, for example, a red color filter. A typical light blocking member has a black color and it is not easy to inspect the transistor during a manufacturing process of a display apparatus. However, when the blue light blocking pattern 120 is the red color filter, a position of the thin film transistor TFT can be easily found and an inspection process can be simplified in the manufacturing process of the display apparatus. The blue light blocking pattern 120 may have a thickness of about 0.5 to 2 micrometers. Preferably, the blue light blocking pattern 120 may have a thickness of about 0.8 to 1.2 um.

The blue light blocking pattern 120 may absorb light having a first wavelength of about 400 nm to about 500 nm. The backlight unit BLU may emit light having the first wavelength, i.e., the blue light, and the blue light blocking pattern 120 may absorb the blue light directly or may absorb the blue light reflected by the polarizer POL. The blue light blocking pattern 120 can be any material that absorbs this light. For example, the blue light blocking pattern 120 may be a green color filter. In some exemplary embodiments, the blue light blocking pattern 120 may be black light blocking pattern.

The blue light blocking pattern 120 can prevent the blue light reflected by the polarizing element POL from being incident on the channel region of the thin film transistor TFT to deteriorate performance of the thin film transistor TFT. A portion of the blue light emitted from the backlight unit BLU may be reflected by the polarizer POL made of a metal and a portion of the reflected light may be incident on the thin film transistor TFT. The incident blue light may affect the channel region and leakage current of the transistor may increase. However, since the blue light blocking pattern 120 can block the blue light incident on the channel region, current leakage of the thin film transistor TFT can be prevented and reliability can be improved.

The second inorganic insulation layer 130 may be disposed on the blue light blocking pattern 120. The second insulation layer 130 may include an inorganic insulating material. The second insulation layer 130 may have a thickness of about 1 μm (micrometer) or less. For example, the second insulation layer 130 may have a thickness of about 0.1 um.

The transparent electrode layer may be disposed on the second inorganic insulation layer 130. The transparent electrode layer may include a pixel electrode PE and a shielding electrode SCOM.

The pixel electrode PE may be electrically connected to the thin film transistor TFT through a contact hole CNT formed through the second insulation layer 130. The pixel electrode PE may include a transparent conductive material. For example, the pixel electrode PE may include indium tin oxide (ITO), indium zinc oxide (IZO), etc.

The shielding electrode SCOM may extend in the second direction D2 and may overlap the second data line DL. The blue light blocking pattern 120 and the second inorganic insulating layer 130 are located between the data line DL and the shield electrode SCOM, so that a parasitic capacitance between the data line DL and the shield electrode SCOM is small as compared with the case where only the inorganic insulating layer is formed. Thus, it is possible to prevent display quality deterioration due to the parasitic capacitance.

In addition, the shielding electrode SCOM may extend in the first direction D1 and may overlap the gate line GL.

In addition, the blue light blocking pattern 120 may not be formed at a portion where the contact hole CNT is formed, that is, at a portion where the pixel electrode PE and the drain electrode DE of the thin film transistor TFT are connected to each other. Thus, the blue light blocking pattern 120 may form an opening corresponding to the contact hole CNT.

In addition, the blue light blocking pattern 120 may not be formed in a portion where the pixel electrode PE is formed. Thus, the blue light blocking pattern 120 may form an opening corresponding to the pixel electrode PE.

The main column spacer MCS may be disposed on the second insulation layer 130. The main column spacer MCS may maintain a cell gap. The main column spacer MCS may be disposed to overlap with the floating electrode FE and the blue light blocking pattern 120.

In addition, a portion of the blue light blocking pattern 120 where the thin film transistor TFT is formed may have a height higher than other portions of the blue light blocking pattern 120 due to a height of the thin film transistor TFT. The portion of the blue light blocking pattern 120 and a portion of the second insulating layer 130 where the thin film transistor TFT is formed may form a sub-column spacer SCS. The sub-column spacer SCS is formed at a lower height than the main column spacer MCS, and can maintain a pressed cell gap.

For example, the main column spacer MCS can have a height of about 2.23 μm. An upper surface of the sub-column spacer SCS may be about 0.5 μm lower than the top surface of the main column spacer MCS.

The liquid crystal layer LC may be disposed on the pixel electrode PE and the second inorganic insulating layer 130 on which the main column spacer MCS is disposed. Thus, the liquid crystal layer LC may be disposed between the pixel electrode PE and the common electrode CE. The liquid crystal layer LC may include liquid crystal molecules having optical anisotropy. The liquid crystal molecules may be driven by an electric field to transmit or block light passing through the liquid crystal layer LC to display an image.

The common electrode CE may be disposed on the liquid crystal layer LC. A common voltage may be applied to the common electrode CE. The common electrode CE may include a transparent conductive material. For example, the common electrode CE may include indium tin oxide (ITO), indium zinc oxide (IZO), and the like.

A capping layer 240 may be disposed on the common electrode CE. The capping layer 240 may be disposed between the polarizer POL and the common electrode CE to cap the polarizer POL. The capping layer 240 may include an inorganic or organic insulating material.

The polarizer POL may be disposed on the capping layer 240. The polarizer POL may be a wire grid polarizer. The wire grid polarizer may include a plurality of fine wires extending in one direction, which are formed of metal and arranged at regular interval. The fine wires may have a pitch of about 50 nm (nanometer) to 150 nm. The pitch refers to a sum of a width of the fine line and a distance between adjacent fine lines.

The planarization layer 230 may be disposed on the polarizer POL. A surface of the planarization layer 230 in contact with the polarizer POL may be flat. The planarization layer 230 may include an organic or inorganic insulating material.

The light recycling filter layer 220 may be disposed on the planarization layer 230. The light recycling filter layer 220 may be a yellow light recycling filter. The light recycling filter layer 220 may reflect the blue light which is emitted from the backlight unit BLU and reflected toward the liquid crystal layer LC while passing the transparent pattern T, the first color conversion pattern R, the second color conversion pattern G, and the blue light blocking layer 210, so that the brightness of the display apparatus can be improved.

The transparent pattern T may be disposed on the light recycling filter layer 220 in the first pixel area PX1. The transparent pattern T may include scattering particles that change traveling direction without changing the wavelength of the blue light provided by the backlight unit BLU. The scattering particles may be particles such as $TiO_2$, $Al_2O_3$, and $SiO_2$, and size of scattering particle may be based on the size of red quantum dot or green quantum dot. In addition, the transparent pattern T may further include a blue pigment for converting transmitted light into blue light.

The first color conversion pattern R may be disposed in the second pixel region PX2 on the light recycling filter layer 220. The first color conversion pattern R may be a red color conversion pattern. The first color conversion pattern R may convert the blue light provided by the backlight unit BLU into red light. For example, the first color conversion pattern R may include color conversion materials such as red quantum dot particles and/or red phosphors.

The second color conversion pattern G may be disposed on the light recycling filter layer 220 in the third pixel region PX3. The second color conversion pattern G may be a green color conversion pattern. The second color conversion pattern G may convert the blue light provided by the backlight unit BLU into green light. For example, the second color conversion pattern G may include color conversion materials such as green quantum dot particles and/or green phosphors.

The red or green quantum dot may be a material that has a nano-scaled structure and may include several hundred to several thousand atoms. Since the quantum dot is very small in size, a quantum confinement effect may occur. The quantum confinement effect may indicate that an energy band gap of an object is increased when the object becomes smaller than nano size. When the light having energy higher than that of the band gap is incident to the quantum dot, the quantum dot may absorb the light and may emit a second light having a specific wavelength and an energy level in the ground state. The wavelength of the emitted second light may have a value corresponding to the band gap. When a size and a composition of the quantum dot are adjusted, the emission property of the quantum dot may be controlled by the quantum confinement.

The composition of the quantum dots is not limited to a specific composition, and any suitable composition may be used. For example, the quantum dot may be a quantum dot of Group II-VI elements, Group III-V elements, Group IV elements, or Group IV-VI elements. The Group II elements may be selected from the group consisting of at least one of zinc, cadmium, and mercury. The group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The red phosphor may be one of (Ca, Sr, Ba)S, (Ca, Sr, Ba)$_2$Si$_5$N$_8$, CaAlSiN$_3$, CaMoO$_4$, and Eu$_2$Si$_5$N$_8$, but is not limited thereto.

The green phosphor may be at least one selected from the group consisting of yttrium aluminum garnet (YAG), (Ca, Sr, Ba)$_2$SiO$_4$, SrGa$_2$S$_4$, barium magnesium aluminate (BAM), alpha-SiAlON(α-SiAlON), beta-SiAlON(β-SiAlON), Ca$_3$Sc$_2$Si$_3$O$_{12}$, Tb$_3$Al$_5$O$_{12}$, BaSiO$_4$, CaAlSiON, and (Sr1-xBax)Si$_2$O$_2$N$_2$, but is not limited thereto.

The blue light blocking layer 210 may be disposed on the first color conversion pattern R and the second color conversion pattern G. Thus, the blue light blocking layer 210 may be disposed in the second pixel region PX2 and the third pixel region PX3. The blue light blocking layer 210 may be formed by alternately laminating at least two layers having different refractive indexes. The blue light blocking layer 210 may transmit wavelengths except the blue wavelength band of transmitted light and block the blue wavelength band. The blocked blue light may be reflected for optical recycling.

The blue light incident from the backlight unit BLU is converted into red or green through the first or second color conversion pattern R or G. At this time, some of the blue light is not changed and passes therethrough. The blue light blocking layer 210 may have a structure in which a single layer or a plurality of layers are stacked. The blue light blocking layer 210 may include any material for performing the above-mentioned effects, and may be a yellow color filter, for example.

The light blocking pattern BM may be disposed on the second base substrate 200. The light blocking pattern BM may overlap with the thin film transistor TFT, the gate line GL, the data line DL, the floating electrode FE, and the main column spacer MCS.

The second base substrate 200 may be disposed on the light blocking pattern BM, the blue light blocking layer 210, and the transparent pattern T. The second base substrate 200 may include a transparent insulation substrate. For example, the second base substrate 200 may include a glass substrate, a quartz substrate, a transparent resin substrate, etc. Examples of the transparent resin substrate for the second base substrate 200 may include polyimide-based resin, acryl-based resin, polyacrylate-based resin, polycarbonate-based resin, polyether-based resin, sulfonic acid containing resin, polyethyleneterephthalate-based resin, etc.

Although not shown, the display apparatus may include an upper alignment layer formed between the liquid crystal layer LC and the common electrode CE, a lower alignment layer formed between the liquid crystal layer LC and the pixel electrode PE, a lower polarizer disposed between the second base substrate 200 and the backlight unit BLU, etc.

In the case of a backlight unit of a general display apparatus, white light is emitted, but the display apparatus according to the exemplary embodiment of the present disclosure emits blue light as described above. In the case of blue light having a short wavelength, loss of transmittance may occur due to the organic insulating layer located inside the display apparatus. However, in the display apparatus according to the present disclosure, since the organic insulating layer is omitted in the lower substrate on which the thin film transistor is formed and only the inorganic insulating layer is included, the loss of transmittance can be minimized. Table 1 below shows a difference in luminance when the display apparatus displays white color in case of an organic insulating film is applied to a lower substrate and in case of an inorganic insulating film is applied.

TABLE 1

| Sample | Organic insulation layer | | | Inorganic insulation layer | |
|---|---|---|---|---|---|
| | 1 | 2 | 3 | 4 | 5 |
| White luminance | 146.6 | 142.4 | 144.7 | 191.6 | 188.8 |

As shown in Table 1, the luminance is decreased when the organic insulating film is used, and the luminance is increased when the inorganic insulating film is used.

In addition, the display apparatus may include a shielding electrode SCOM overlapping the data line DL and the gate line GL, and the blue light blocking pattern 120 may be formed between the data line DL and the shielding electrode SCOM, and between the gate line GL and the shielding electrode SCOM. Accordingly, it is possible to prevent deterioration of display quality due to parasitic capacitance between the data and gate lines DL and GL and the shielding electrode 120, and it is possible to prevent light leakage caused by inability to control the liquid crystal around the gate line GL and the data line DL.

In addition, since the blue light blocking pattern 120 is located on the thin film transistor TFT, the characteristics of the thin film transistor TFT may be improved, and the sub-column spacer SCS may be formed. Thus, when forming the main column spacer MCS, it is possible to secure a pressing gap without forming a separate sub-column spacer using a halftone mask or the like.

Referring again to FIG. 3C, a width e of the blue light blocking pattern 120 may be substantially the same as a width of the light blocking pattern a. A width c of the shielding electrode SCOM may be greater than a width b of the data line DL. Preferably, the width c of the shielding electrode SCOM may be greater than the width b of the data line DL by about 4.5 um or more. The blue light blocking pattern 120 and the pixel electrode PE may be spaced apart from each other by a predetermined distance. Preferably, a separation distance d between the blue light shielding pattern 120 and the pixel electrode PE may be about 3.5 µm or more. The widths or thicknesses of the above structures are illustrative of the numerical values according to one exemplary embodiment, but are not limited thereto.

FIGS. 4A, 4B, 4C, 5A, 5B, 5C, 6A, 6B, 6C, 7A, 7B and 7C are plan views and cross sectional views illustrating a method of manufacturing the display apparatus of FIG. 2.

Figure 4A:
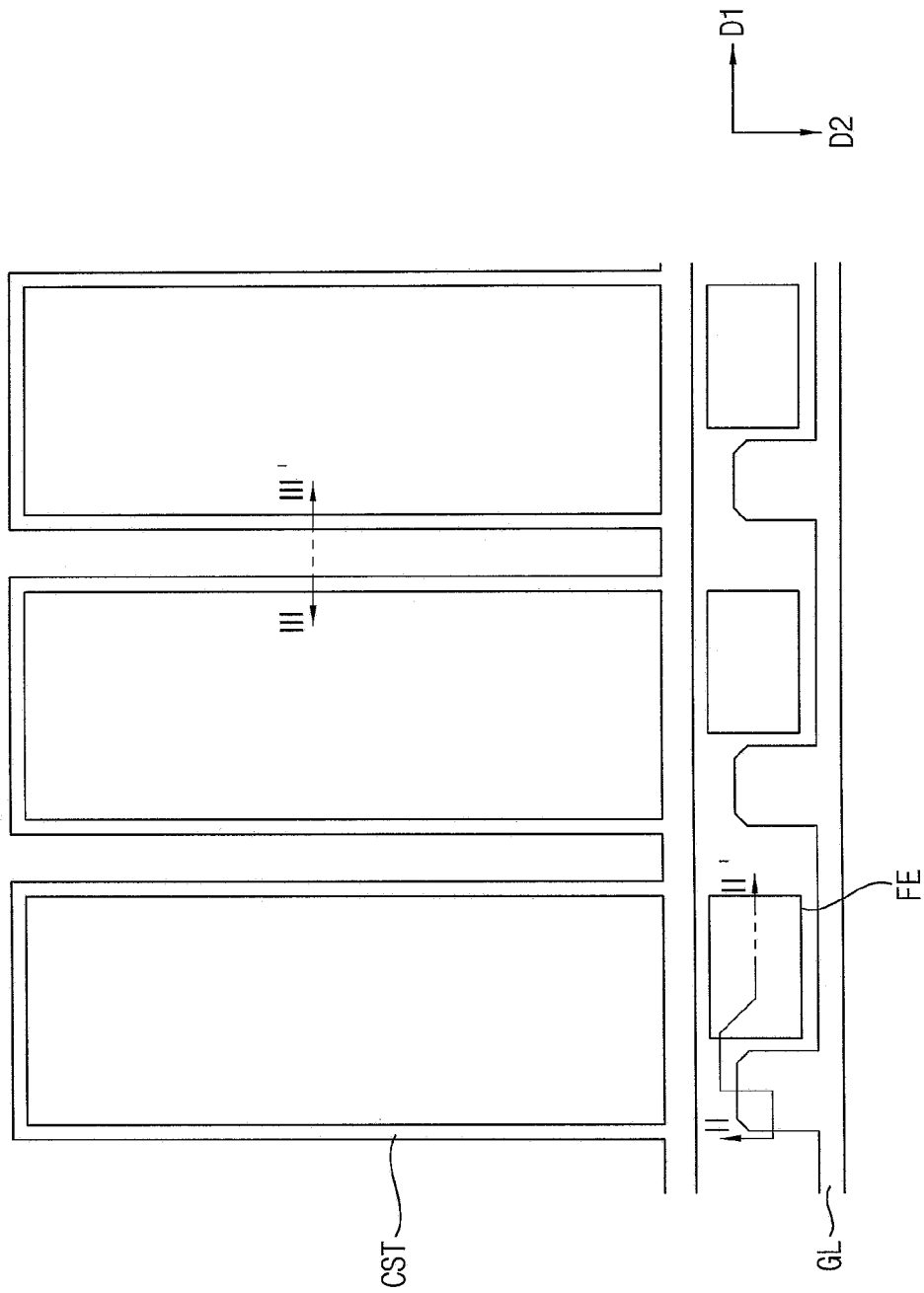
Figure 4B:
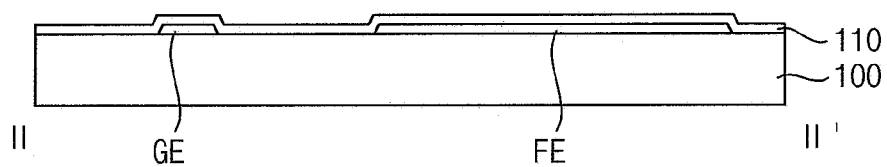
Figure 4C:
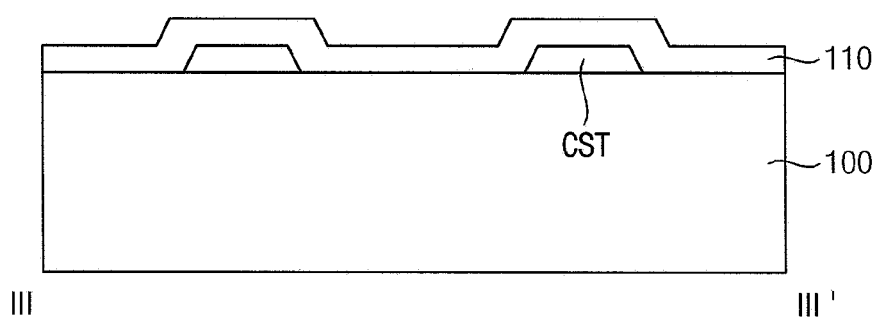

Referring to FIGS. 4A, 4B, and 4C, a gate pattern may be formed on the first base substrate 100. The first inorganic insulating layer 110 may be formed on the gate pattern.

After forming a conductive layer (not shown) on the first base substrate 100, the conductive layer may be patterned using a photolithography process or an etching process using an additional etching mask to obtain the gate pattern. The gate pattern may include a gate line GL, a gate electrode GE, a floating electrode FE, and a CST line CST.

The first inorganic insulating layer 110 may be obtained by a sputtering process, a chemical vapor deposition process, a pulsed laser deposition process, or the like.

Figure 5B:
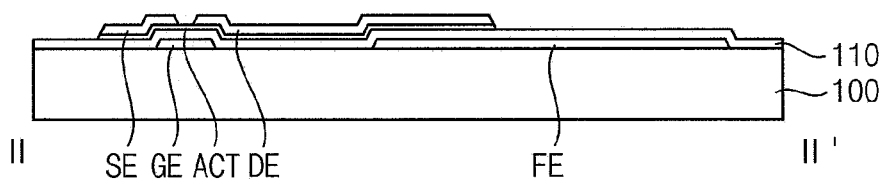
Figure 5C:
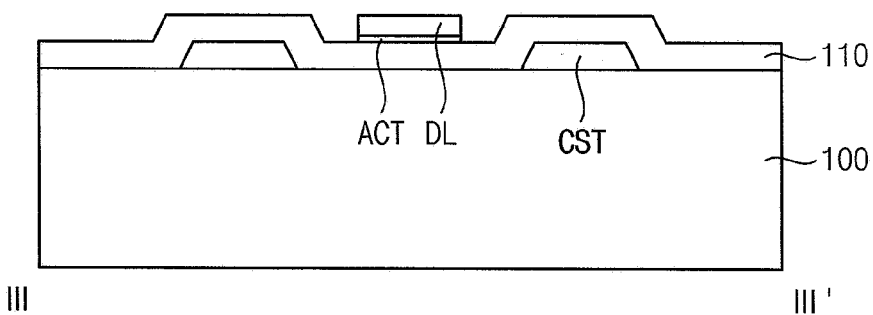

Referring to FIGS. 5A, 5B, and 5C, an active pattern ACT and a data pattern may be formed on the first inorganic insulating layer 110.

After forming an active layer (not shown) on the first inorganic insulating layer 110, a conductive layer can be formed on the active layer. And then, the conductive layer and the active layer may be simultaneously patterned to form the active pattern and the data pattern.

The data pattern may include a data line DL, a source electrode SE, and a drain electrode DE. The gate electrode GE, the active pattern ACT, the source electrode SE, and the drain electrode DE may be included as components of a thin film transistor TFT.

Figure 6B:
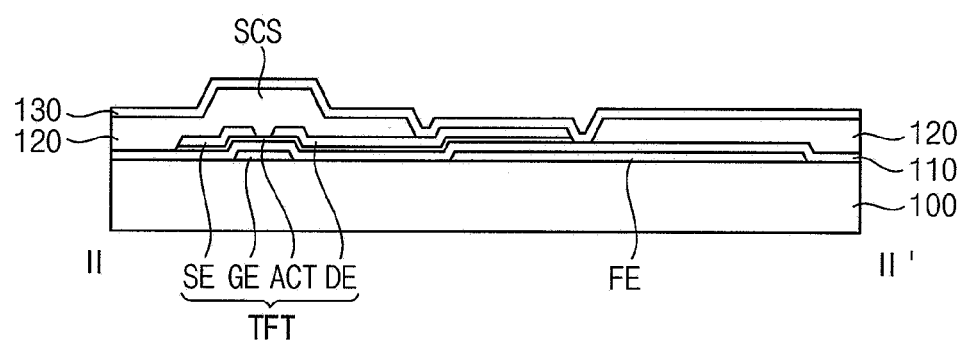
Figure 6C:
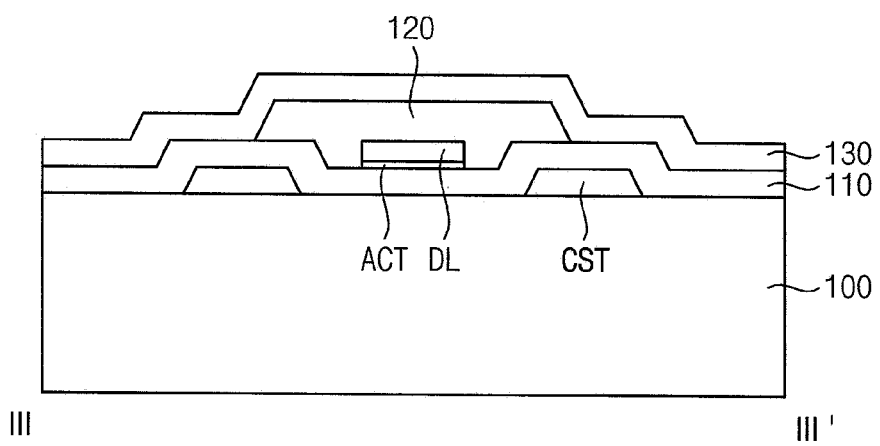

Referring to FIGS. 6A, 6B and 6C, a blue light blocking pattern 120 may be formed on the first inorganic insulating layer 110 on which the data pattern is formed. A second inorganic insulating layer 130 may be formed on the first inorganic insulating layer 110 on which the blue light blocking pattern 120 is formed.

The blue light blocking pattern 120 may be formed by forming a red photoresist layer on the first inorganic insulating layer 110 and then exposing and developing the same.

The second inorganic insulating layer 130 may be obtained by a sputtering process, a chemical vapor deposition process, a pulsed laser deposition process, or the like.

Figure 7A:
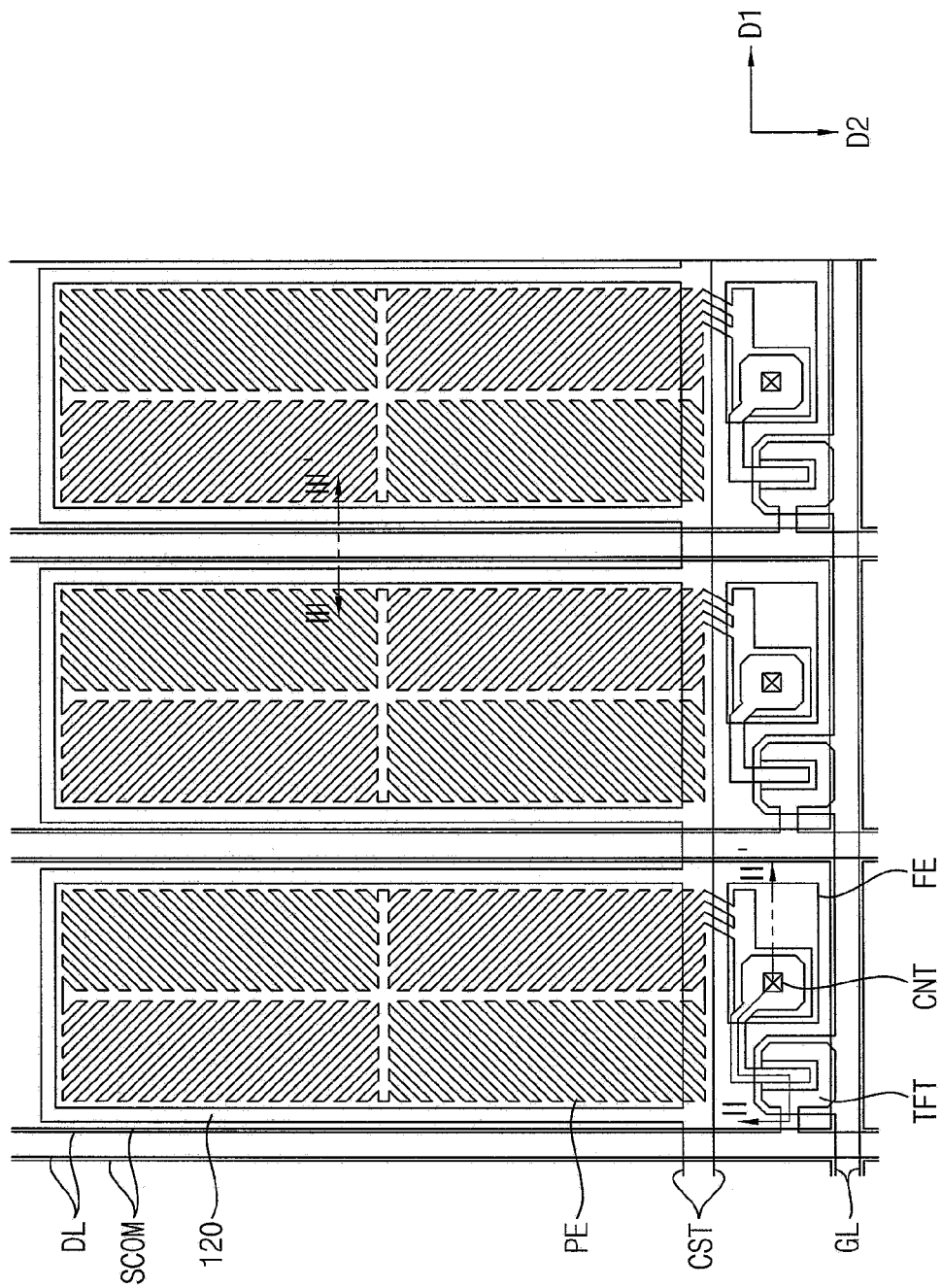
Figure 7B:
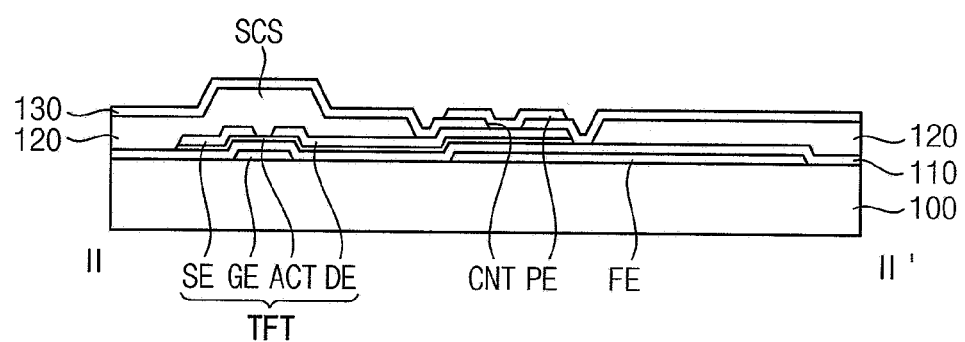
Figure 7C:
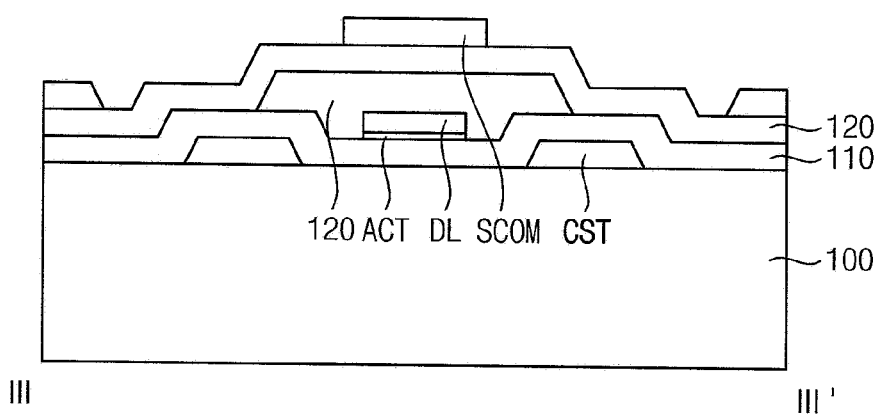

Referring to FIGS. 7A, 7B and 7C, a transparent electrode layer may be formed on the second insulation layer 130 after forming a contact hole CNT exposing the drain electrode DE through the second insulation layer 130. The transparent electrode layer may include a pixel electrode PE and a shielding electrode SCOM. After forming a transparent conductive layer (not shown) on the second insulation layer 130, the transparent conductive layer may be patterned using a photolithography process or an etching process using an additional etching mask to obtain the transparent electrode layer.

Referring again to FIGS. 2, 3A and 3B, remaining components of the display apparatus may be formed. Thus, a light shielding pattern BM may be formed on the second base substrate 200. A blue light blocking layer 210 may be formed on the second base substrate 200 on which the light blocking pattern BM is formed. First and second color conversion patterns R and G and the transmission pattern T may be formed on the second base substrate 200 on which the blue light blocking layer 210 is formed. A light recycling filter layer 220 may be formed on the first and second color conversion patterns R and G and the transparent pattern T. A planarization layer 230 may be formed on the light recycling filter layer 220. A polarizer POL may be formed on the planarization layer 230. A capping layer 240 may be formed on the polarizer POL. A common electrode CE may be formed on the capping layer 240.

A liquid crystal layer LC may be formed between an upper substrate on which the common electrode CE is formed and a lower substrate on which the pixel electrode PE is formed to form a display panel including the upper substrate and the lower substrate. The display apparatus may be manufactured by providing a backlight unit BLU under the display panel.

FIG. 8 is a plan view illustrating first to third pixel areas of a display apparatus according to an exemplary embodiment. FIG. 9 is a cross-sectional view taken along a line III-III' of FIG. 8.

Referring to FIGS. 8 and 9, the display apparatus may be substantially the same as the display apparatus of FIGS. 2 to 3B except that the shielding electrode SCOM includes a first shielding electrode portion SCOM1 and a second shielding electrode portion SCOM2. Therefore, repeated description will be omitted.

The shielding electrode SCOM may include the first shield electrode portion SCOM1 and the second shield electrode portion SCOM2 spaced apart from and extending in parallel to the first shield electrode portion SCOM1 and the first shield electrode portion SCOM1. A region overlapping the shielding electrode SCOM and the data line DL is smaller than that of the exemplary embodiment of FIG. 2. Accordingly, parasitic capacitance between the data line DL (or the gate line) and the shielding electrode SCOM is smaller than that of the exemplary embodiment of FIG. 2. It is possible to prevent display quality from deteriorating due to the parasitic capacitance.

Figure 10:
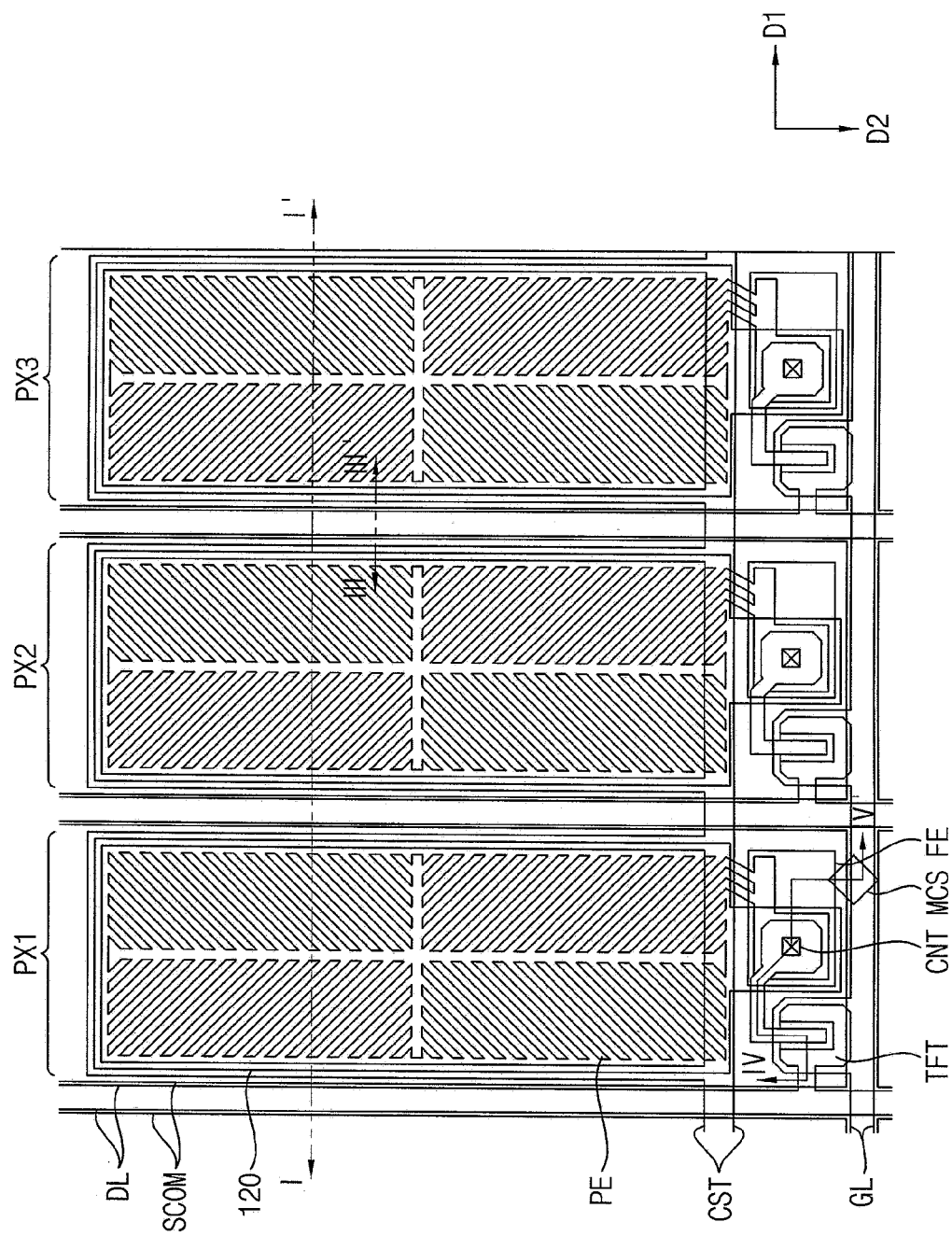
FIG. 10 is a plan view illustrating first to third pixel areas of a display apparatus according to an exemplary embodiment of the inventive concepts.
Figure 11:
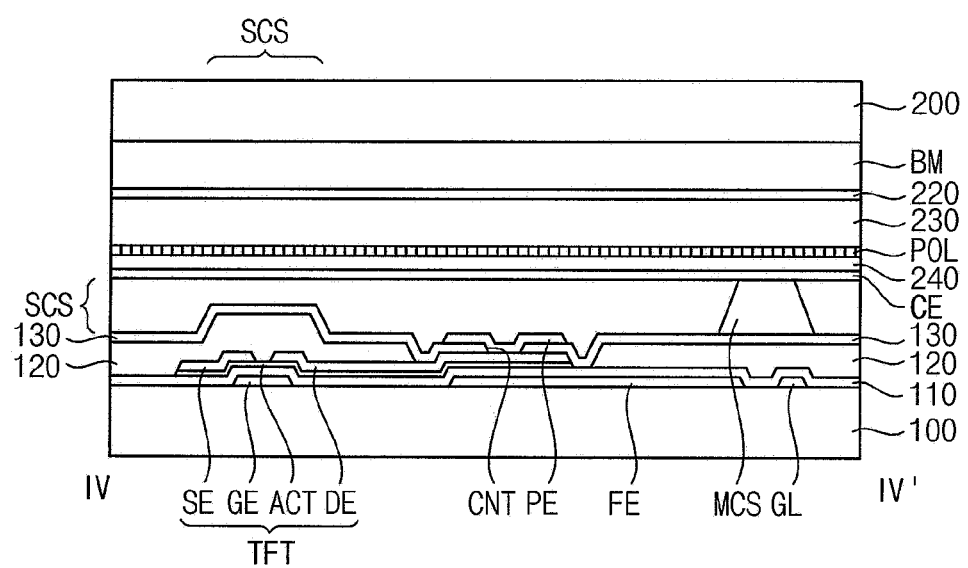
FIG. 11 is a cross-sectional view taken along a line IV-IV' of FIG. 10.

FIG. 10 is a plan view illustrating first to third pixel areas of a display apparatus according to an exemplary embodiment. FIG. 11 is a cross-sectional view taken along a line IV-IV' of FIG. 10.

Referring to FIGS. 10 and 11, the display apparatus may be substantially the same as the display device of FIGS. 2 to 3B except for a position of a main column spacer MCS. Therefore, repeated description will be omitted.

The main column spacer MCS may overlap the gate line GL. Accordingly, a gate pattern, a first inorganic insulating layer 110, a blue light blocking pattern 120, and a second inorganic insulating layer 130 may be positioned on the main column spacer MCS and the first base substrate 100.

According to exemplary embodiments, since the organic insulating layer is omitted in the lower substrate on which the thin film transistor is formed, and the display apparatus includes only the inorganic insulating layer, loss of transmittance of the blue light emitted from the backlight unit may be minimized.

In addition, the display apparatus may include a shielding electrode overlapping the data line and the gate line. A blue light blocking pattern may be formed between the data line and the shielding electrode, and between the gate line and the shielding electrode. Accordingly, it is possible to prevent deterioration of display quality due to parasitic capacitance between the data and gate lines and the shielding electrode, and it is possible to prevent light leakage caused by inability to control the liquid crystal around the gate line and the data line.

In addition, since the blue light blocking pattern is located on the thin film transistor, the characteristics of the thin film transistor may be improved, and the sub-column spacer may be formed. Thus, when forming the main column spacer, it is possible to secure a pressing gap without forming a separate sub-column spacer using a halftone mask or the like.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method of manufacturing a display apparatus, comprising:
   providing a backlight unit emitting blue light;
   forming a gate pattern comprising a gate electrode on a first base substrate;
   forming a first inorganic insulation layer on the gate pattern;
   forming a semiconductor pattern on the first inorganic insulation layer, the semiconductor pattern having a channel region overlapping the gate electrode;
   forming a data pattern comprising a drain electrode and a source electrode on the first inorganic insulation layer and the semiconductor pattern, wherein the gate electrode, the source electrode, and the channel region form a thin film transistor (TFT);
   forming a blue light blocking pattern on the data pattern, the blue light blocking pattern overlapping the TFT;
   forming a second insulation layer on the blue light blocking pattern;
   forming a shielding electrode and a pixel electrode on the second inorganic insulation layer;
   forming a color conversion pattern, wherein the color conversion pattern comprising a quantum dot or phosphor on a second base substrate;
   forming a planarization layer on the color conversion pattern;
   forming a wire grid polarizer on the planarization layer; and
   forming a liquid crystal layer between the first base substrate on which the pixel electrode is formed and the second base substrate on which the wire grid polarizer is formed,
   wherein the blue light blocking pattern contacts an upper surface of the drain electrode and an upper surface of the source electrode.

2. A method of manufacturing a display apparatus, comprising:
   providing a backlight unit emitting blue light;
   forming a gate pattern comprising a gate electrode on a first base substrate;
   forming a first inorganic insulation layer on the gate pattern;
   forming a data pattern comprising a drain electrode, a source electrode, and a data line on the first inorganic insulation layer;
   forming a blue light blocking pattern on the data pattern;
   forming a second insulation layer on the blue light blocking pattern;
   forming a shielding electrode and a pixel electrode on the second inorganic insulation layer;
   forming a color conversion pattern, wherein the color conversion pattern comprises a quantum dot or phosphor on a second base substrate;
   forming a planarization layer on the color conversion pattern;
   forming a wire grid polarizer on the planarization layer; and
   forming a liquid crystal layer between the first base substrate on which the pixel electrode is formed and the second base substrate on which the wire grid polarizer is formed,
   wherein:
   the shielding electrode is formed to overlap the data line,
   the blue light blocking pattern is disposed between the data line and the shielding electrode,
   the display apparatus comprises a thin film transistor comprising the gate electrode, the source electrode, and the drain electrode, and
   the blue light blocking pattern is disposed between the thin film transistor and the liquid crystal layer.

3. The method of claim 2, further comprising forming a main column spacer on the second insulation layer,
   wherein the gate pattern, the first inorganic insulation layer, the blue light blocking pattern, and the second inorganic insulation layer are disposed between the first main column spacer and the first base substrate.

4. A method of manufacturing a display apparatus, comprising:
   providing a backlight unit emitting blue light;
   forming a gate pattern comprising a gate electrode on a first base substrate;
   forming a first inorganic insulation layer on the gate pattern;
   forming a data pattern comprising a drain electrode on the first inorganic insulation layer;
   forming a blue light blocking pattern on the data pattern, wherein the blue light blocking pattern is a red color filter;
   forming a second insulation layer on the blue light blocking pattern;
   forming a shielding electrode and a pixel electrode on the second inorganic insulation layer;
   forming a color conversion pattern, wherein the color conversion pattern comprising a quantum dot or phosphor on a second base substrate;
   forming a planarization layer on the color conversion pattern;
   forming a wire grid polarizer on the planarization layer; and
   forming a liquid crystal layer between the first base substrate on which the pixel electrode is formed and the second base substrate on which the wire grid polarizer is formed.

* * * * *